(12) United States Patent
Rodgers

(10) Patent No.: US 10,556,639 B2
(45) Date of Patent: Feb. 11, 2020

(54) WIRELESS SPROCKET SHIFTING CONTROL SYSTEM

(71) Applicant: Brandon Rodgers, Los Osos, CA (US)

(72) Inventor: Brandon Rodgers, Los Osos, CA (US)

( * ) Notice: Subject to any disclaimer, the term of this patent is extended or adjusted under 35 U.S.C. 154(b) by 176 days.

(21) Appl. No.: 15/703,273

(22) Filed: Sep. 13, 2017

(65) Prior Publication Data

US 2018/0127058 A1 May 10, 2018

Related U.S. Application Data

(60) Provisional application No. 62/394,014, filed on Sep. 13, 2016.

(51) Int. Cl.
| | | |
|---|---|---|
| *B62M 9/122* | (2010.01) | |
| *B62M 25/08* | (2006.01) | |
| *F16C 1/16* | (2006.01) | |
| *F16C 1/14* | (2006.01) | |
| *F16H 25/20* | (2006.01) | |
| *B62K 23/02* | (2006.01) | |

(52) U.S. Cl.
CPC ............ *B62M 9/122* (2013.01); *B62M 25/08* (2013.01); *F16C 1/14* (2013.01); *F16C 1/16* (2013.01); *B62K 23/02* (2013.01); *F16C 2326/28* (2013.01); *F16H 25/20* (2013.01)

(58) Field of Classification Search
CPC .... B62M 25/08; B62M 9/122; B62M 25/045; B62M 9/132; Y10T 74/20438
USPC .......................................................... 474/78
See application file for complete search history.

(56) References Cited

U.S. PATENT DOCUMENTS

| | | | | |
|---|---|---|---|---|
| 5,577,969 A * | 11/1996 | Watarai | ................... | B62M 9/122 474/78 |
| 6,623,389 B1 * | 9/2003 | Campagnolo | .......... | B62M 9/122 474/70 |
| 6,634,971 B2 * | 10/2003 | Campagnolo | .......... | B62M 9/122 474/78 |
| 6,884,190 B2 * | 4/2005 | Takebayashi | ............ | B62M 9/10 474/70 |
| 7,144,027 B2 * | 12/2006 | Kitamura | ............. | B62M 25/045 280/260 |
| 7,207,912 B2 * | 4/2007 | Takeda | ................. | B62M 25/045 280/260 |
| 7,373,232 B2 * | 5/2008 | Guderzo | ................ | B62M 9/122 474/116 |
| 9,037,368 B2 * | 5/2015 | Miglioranza | ............. | F16H 9/04 701/60 |
| 9,714,067 B1 * | 7/2017 | Hara | ....................... | B62M 9/122 |
| 10,252,772 B2 * | 4/2019 | Sala | ....................... | B62K 23/06 |

(Continued)

OTHER PUBLICATIONS

U.S. Appl. No. 15/183,913, filed Oct. 6, 2016, Shipman, Christopher.

*Primary Examiner* — Henry Y Liu
(74) *Attorney, Agent, or Firm* — Patrick Reilly

(57) ABSTRACT

A wireless control system for engagement with a transmission system for a servomotor coupled with sprocket assemblies of remote controlled systems, and within vehicles, including bicycles, is disclosed. The system selectively shifts a chain to each of a plurality of provided sprockets reduces various complications associated with cable slack and precision shifting among an ordered sequence sprockets. The wireless control system allows a user to direct a derailleur to translate drive means from one position to another along a desired path.

24 Claims, 16 Drawing Sheets

(56) References Cited

U.S. PATENT DOCUMENTS

| | | | |
|---|---|---|---|
| 2002/0061797 A1* | 5/2002 | Valle | B62M 9/132 |
| | | | 474/70 |
| 2004/0166972 A1* | 8/2004 | Takeda | B62M 25/045 |
| | | | 474/78 |
| 2005/0043129 A1* | 2/2005 | Guderzo | B62M 9/122 |
| | | | 474/78 |
| 2005/0098978 A1* | 5/2005 | Kitamura | B62M 25/045 |
| | | | 280/260 |
| 2005/0009897 A1 | 10/2005 | Regan | |
| 2006/0100045 A1* | 5/2006 | Fukuda | B62M 25/08 |
| | | | 474/70 |
| 2007/0137361 A1 | 6/2007 | Fujii | |
| 2009/0315692 A1 | 12/2009 | Miki | |
| 2014/0032067 A1* | 1/2014 | Miglioranza | F16H 9/04 |
| | | | 701/60 |
| 2014/0102237 A1 | 4/2014 | Jordan | |

* cited by examiner

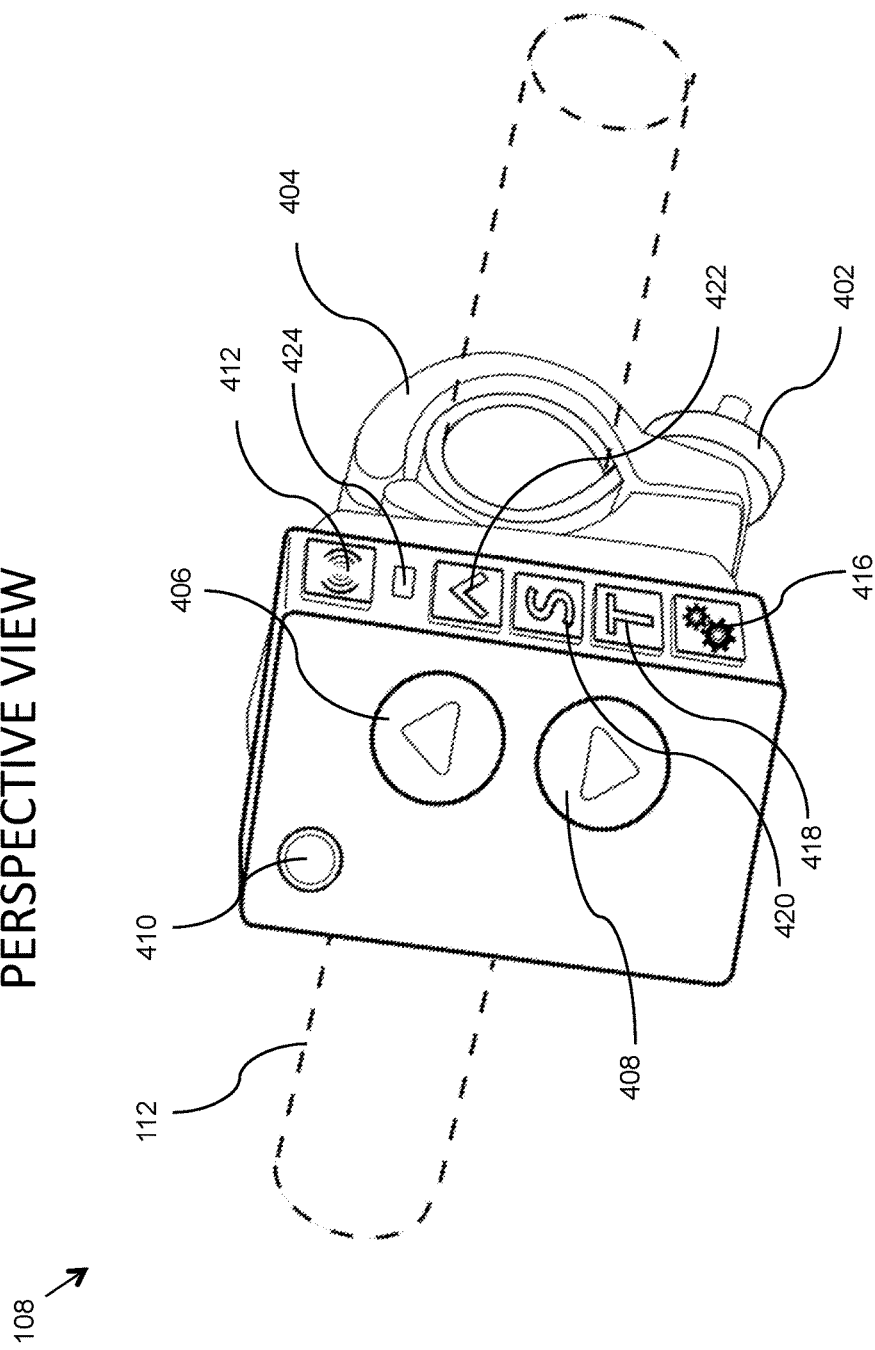

WIRELESS SPROCKET SHIFTING CONTROL SYSTEM

CO-PENDING APPLICATION

The present Nonprovisional patent Application is a Continuation-in-Part Nonprovisional patent application to, and claims the priority date of U.S. Provisional Patent Application Ser. No. 62/394,014 filed on Sep. 13, 2016. This U.S. Provisional Patent Application Ser. No. 62/394,014 is hereby incorporated by reference in its entirety and for all purposes into the present Nonprovisional patent application.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Servomotors are widely applied to shift an engaging member, such as a chain, form one sprocket to another within a sprocket assembly wherein the sprockets are generally arranged to be co-planar. In other art, wireless control systems, such as smartphones enabled with BLUETOOTH™ wireless communications standard as maintained by the Bluetooth Special Interest Group of Kirkland, Wash., or other suitable wireless communications means, are becoming increasing ubiquitous.

Certain preferred embodiments of the present invention are related to a power operated gear change assembly for bicycles, of the type comprising a gear change having a plurality of sprocket pinions, arranged coaxially to one another, having different diameters and selectively engageable by an endless chain; a derailleur displaceable into a plurality of positions each corresponding to engagement of the chain with a respective sprocket pinion; a wirelessly controlled powered actuator for performing displacement of the derailleur through said plurality of positions; manual control means for generating wireless signals that direct the actions of the powered actuator; detecting means for detecting displacement of the derailleur; and wireless control means operatively associated to said detecting means for controlling the operation of said actuator.

Yet in vehicular control and other aspects of application where a system operator is burdened with safety concerns, the prior art fails to optimally to provide systems and methods for wireless control of servomotors in environments where operator control of shifting between sprockets occurs amid distractions, the asynchronous occurrence of risks of damage, and difficulties in an operator maintaining prolonged visual observations of control interfaces.

It is understood that the scope of meaning of the term gear as applied in the present disclosure includes the meaning of the term of art of sprocket,

SUMMARY AND OBJECTS OF THE INVENTION

Towards these and other objects of the method of the present invention (hereinafter, "the invented method") that are made obvious to one of ordinary skill in the art in light of the present disclosure, the present invention provides a system (hereinafter, "the invented system") for control of a servomotor by wireless communications means, and a method of use thereof. The method of the present invention (hereinafter, "the invented method") allow operator control of one or more servomotors by wireless communications processes.

A first preferred embodiment of the invented system provides a wirelessly controlled shifter and a control module manually operable to generate wirelessly transmitted commands that direct the operation of the shifter. An optional additional wireless-communications enabled device, such as a smart phone, is employed in various additional alternate preferred embodiments of the invented method to program the shifter and share information with the shifter, to include harvesting information from the shifter.

Certain alternate preferred embodiments of the invented method provide (a.) a control module coupled with a frame, such as but limited to a frame of a vehicle such as a bicycle or an automotive device, the control module adapted to transmit wireless commands as directed by a user; (b.) a wireless communications enabled electro-mechanical actuator coupled with a transmission and causing a chain thereof to alter engagement from a first sprocket of the transmission to a second sprocket of the transmission as directed by a wireless command received from the control module; and (c.) an optional electronic communications device, the electronic communications device communicatively coupled with the control module and/or shifter and the electronic communications device adapted to enable a user to customize the effect of at least one parameter of at least one control command prior to transmission by the control module to the shifter.

Certain still alternate preferred embodiments of the invented system provide an actuator comprising a brushless DC motor, a brushed DC motor, a motor encoder, a driveshaft, a drive screw, a linear drive screw, and/or a linear potentiometer.

Certain yet alternate preferred embodiments of the invented system include one or more of (a.) a drive nut movably coupled with the drive screw, (b.) a linear potentiometer coupled with the drive nut, (c.) a grounding wiper coupled with the linear potentiometer, and/or (d.) a tension element coupled with the drive nut, wherein the drive nut motivates the tension element.

Certain even alternate preferred embodiments of the invented system further comprise a control module that transmits commands (a.) in accordance with a wireless communications standard, such as but not limited to a BLUETOOTH™ wireless communications standard as maintained by the Bluetooth Special Interest Group of Kirkland, Wash., and/or (b.) in accordance with an encryption standard communications standard.

Certain yet alternate preferred embodiments of the invented system further comprise an electronic communications device that renders a programmable interface adapted to (a.) enable a user to establish set point values for inclusion in commands; (b.) enable a user to monitor a precision value of the actuator; and/or (c.) enable a user to monitor a control speed of the actuator.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

The detailed description of some embodiments of the invention is made below with reference to the accompanying figures, wherein like numerals represent corresponding parts of the figures.

FIG. 4A is a perspective view of the control module of the first preferred embodiment of the invented system of FIG. 1;

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims. Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
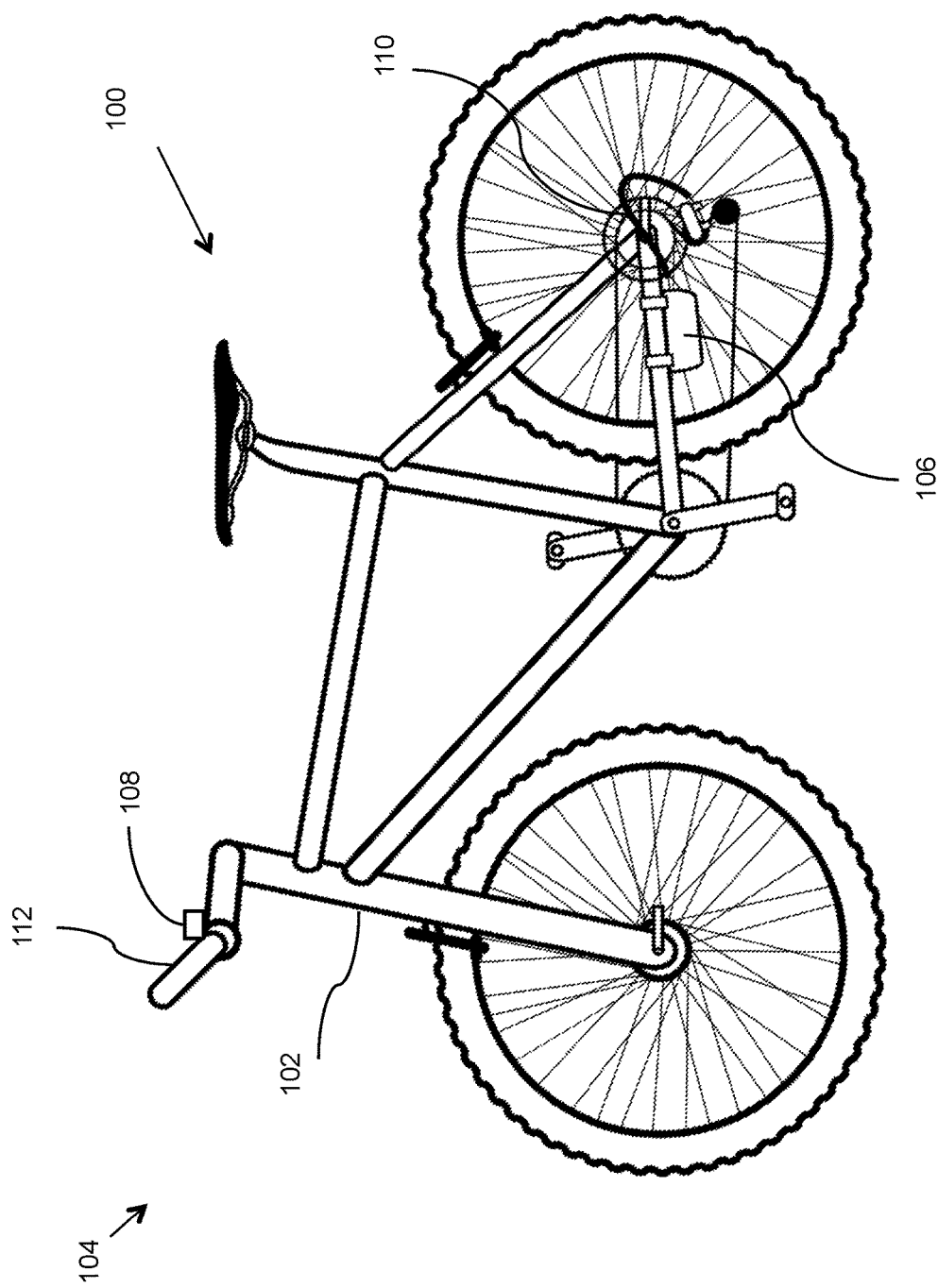
FIG. 1 is an illustration of a first preferred embodiment of the invented system having a control module and a shifter module installed on a bicycle.

Referring now generally to the Figures and particularly to FIG. 1, FIG. 1 illustrates a first preferred embodiment of the invented system 100, (hereinafter, "the first system" 100) coupled with a frame 102 of a bicycle 104. The first system 100 includes a shifter module 106 (hereinafter, "the shifter" 106) and a remote control module (hereinafter, "the control module") 108. The shifter 106 is coupled with both the frame 102 and a derailleur 110 of the bicycle 104 and the control module 108 is coupled with a handlebar 112 of the bicycle 104.

Figure 2A:
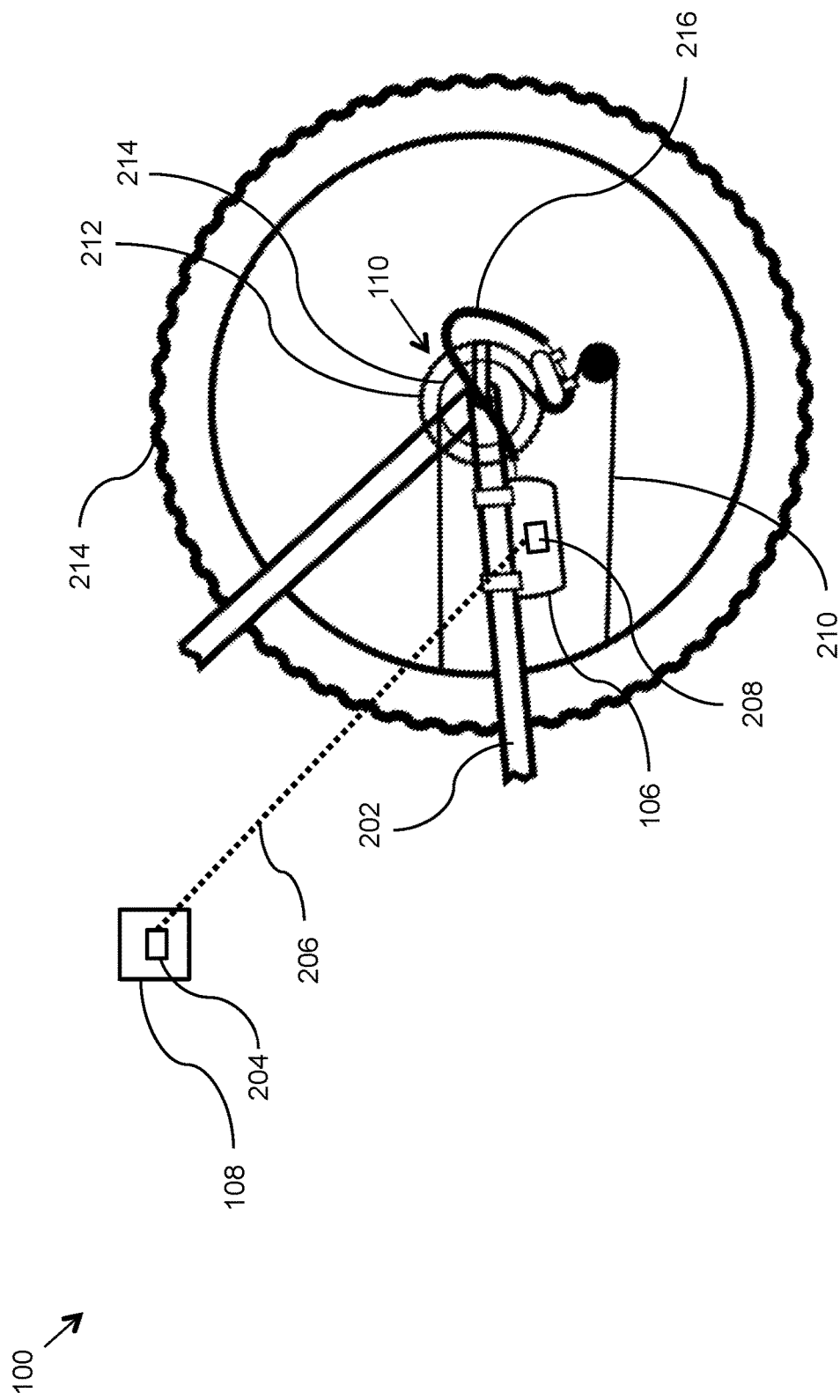
FIG. 2A is a more detailed block diagram of the first preferred embodiment of the invented system of FIG. 1.

Referring now generally to the Figures and particularly to FIG. 2A, FIG. 2A illustrates a first preferred embodiment of the first system 100 with a chain-stay frame section 202, (hereinafter, "the chain-stay" 202) of the bicycle 104. The first system 100 includes the shifter 106 adapted to the chain-stay 202 positioned next to a rear wheel 214 of the bicycle 104 and the remote control 108. A CM wireless communication circuit 204 of the control module 108 is adapted to transmit a wireless signal 206 to a shifter wireless communication circuit 208 of the shifter 106 directing the shifter 106 to change a chain 210 coupling position between a plurality of sprockets 212 & 214 within the derailleur 110. The shifter wireless communication circuit 208 is preferably adapted and configured to send and receive wireless communications in conformance with a wireless communications standard, such as but not limited the BLUETOOTH™ wireless communications standard as maintained by the Bluetooth Special interest Group of Kirkland, Wash., or other suitable wireless communications standard known in the art.

The shifter 106 is coupled with a bowden cable housing and stranded wire cable tension and compression element 216, (hereinafter, "the bowden wire" 216) wherein the shifter 106 uses the bowden wire 216 for controlling the connection between the chain 210 and the sprockets 210 and 214 of the derailleur 110. The CM wireless communication circuit 204 is preferably adapted and configured to send and receive wireless communications in conformance with a wireless communications standard, such as but not limited the BLUETOOTH™ wireless communications standard as maintained by the Bluetooth Special interest Group of Kirkland, Wash., or other suitable wireless communications standard known in the art.

Figure 2B:
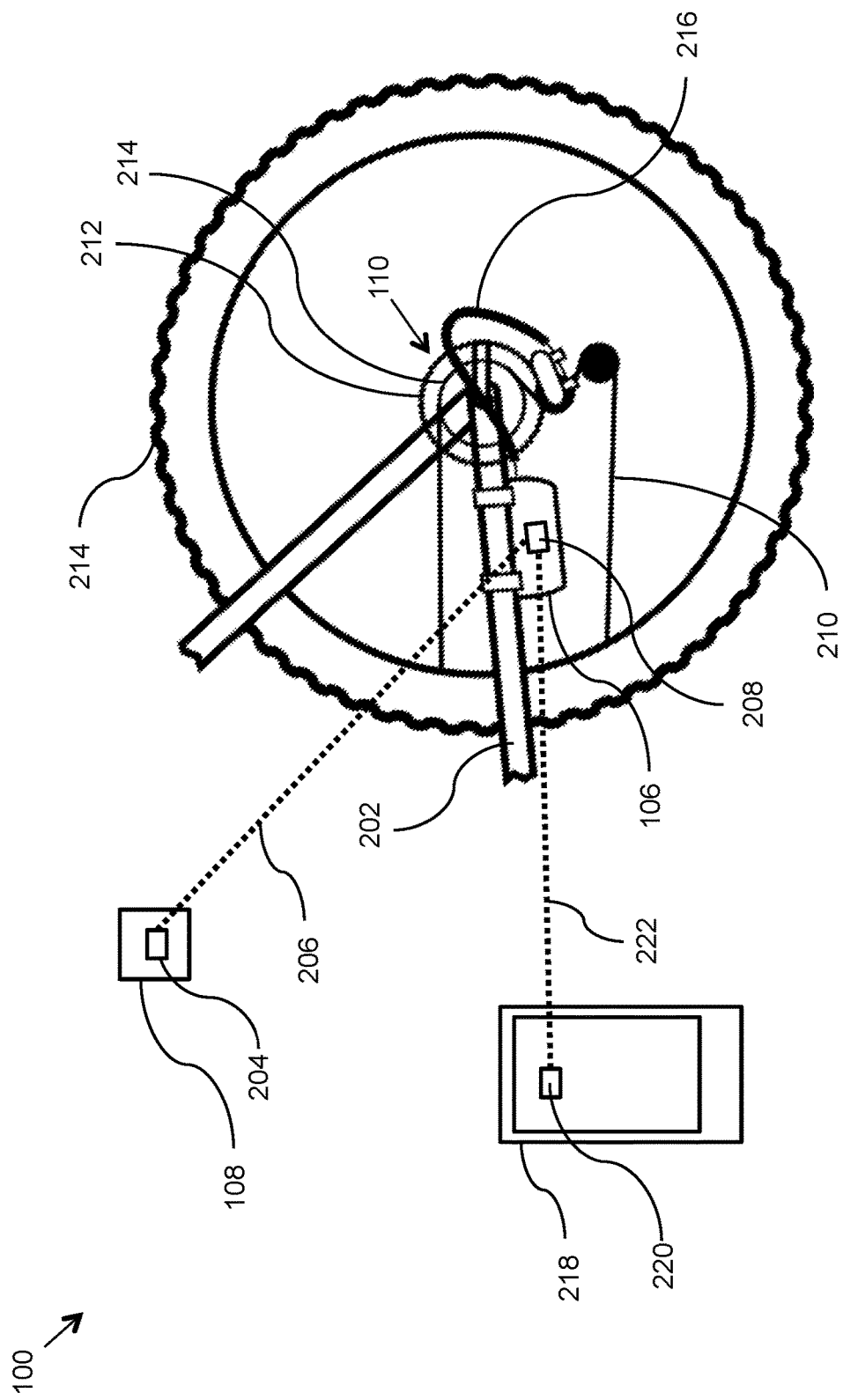
FIG. 2B is a detailed block diagram of the first preferred embodiment of the invented system of FIG. 1 with an optional smartphone.

Referring now generally to the Figures and particularly to FIG. 2B, FIG. 2B illustrates a first system 100 with additional optional aspects. The invented system 100 optionally includes the shifter 106 coupled with the chain-stay 202 and positioned next to the rear wheel 214 of the bicycle 104 and an optional electronic communication device 218, (hereinafter, "the smartphone" 218). The smartphone 218 may be or comprise a wireless communications-enabled product or system such as, but not limited, to an IPHONE™ mobile phone that includes bundled software and is marketed by Apple, Inc. of Cupertino, Calif., or other suitable communications device known in the art.

The CM wireless communication circuit 204 of the control module 108 is adapted to transmit a wireless signal 206 to the shifter wireless communication circuit 208 of the shifter 106 and thereby directing the shifter 106 to change the chain 210 coupling position between the sprockets 212 and 214 within the derailleur 110. Furthermore, the shifter 106 is coupled with the bowden wire 216 wherein the shifter 106 uses the bowden wire 216 for controlling the connection between the chain 210 and the sprockets 210 and 214 of the derailleur 110. Additionally, a third wireless communication circuit 220 of the smartphone 218 is adapted to transmit a wireless signal 222 containing a configuration set point data to the shifter wireless communication circuit 208 of the shifter 106 wherein the configuration set point data is used for configuring the control of the connection between the chain 210 and the sprockets 212 and 214 of the derailleur 110. The third wireless communications circuit 220 is preferably adapted and configured to send and receive wireless communications in conformance with a wireless communications standard, such as but not limited the BLUETOOTH™ wireless communications standard as maintained by the Bluetooth Special interest Group of Kirkland, Wash., or other suitable wireless communications standard known in the art.

Figure 3A:
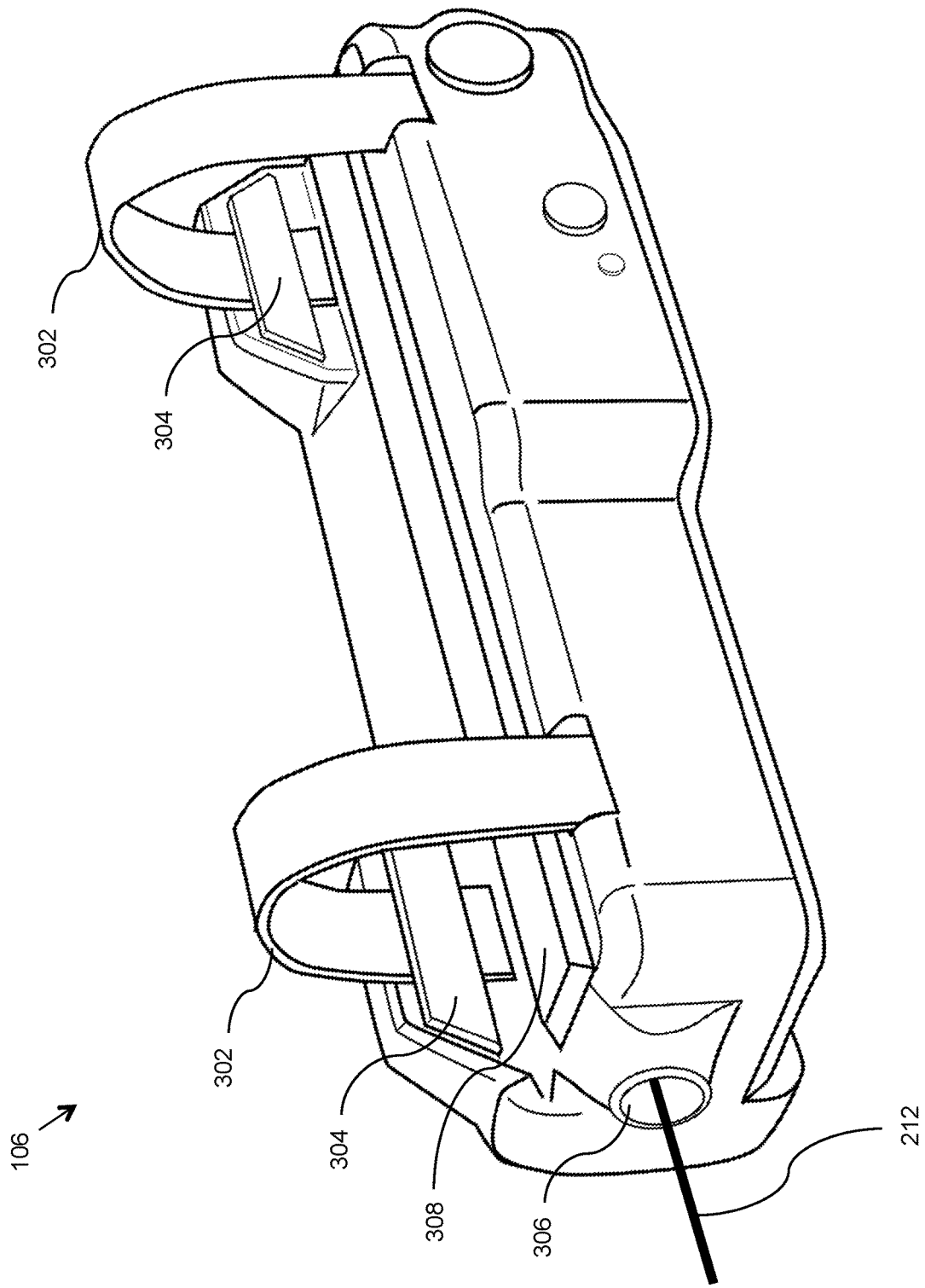
FIG. 3A is a perspective view of the shifter module of the first preferred embodiment of the invented system of FIG. 1.

Referring now generally to the Figures and particularly to FIG. 3A, FIG. 3A illustrates a first preferred embodiment of the shifter 106 of the first system 100 coupled with the bowden wire 216 wherein the bowden wire 216 is inserted into the shifter 106 through a cable housing 302 of the shifter 106. The shifter 106 is adapted with a PVC coated vinyl straps 304, (hereinafter, "the straps") 304 wherein the straps 304 are securely coupled with the shifter 106 body with a clamps 306. Furthermore, the straps 304 are positioned directly above a molded rubber bumper 308 for allowing a frictionless coupling of the shifter 106 to the chain-stay 202.

Figure 3B:
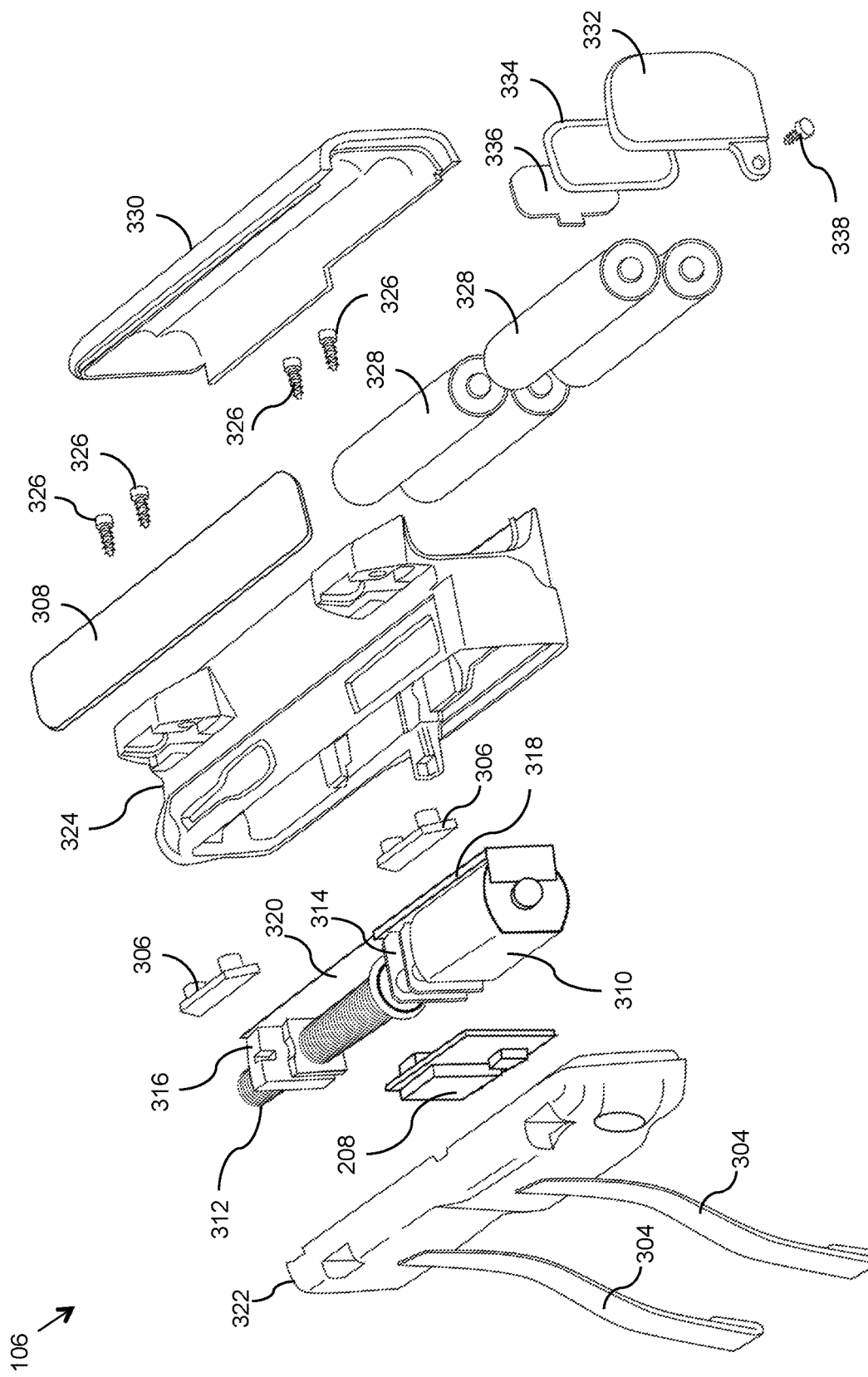
FIG. 3B is an exploded detailed view of the shifter module of the first preferred embodiment of the invented system of FIG. 1.

Referring now generally to the Figures and particularly to FIG. 3B, FIG. 3B illustrates the exploded view of a first preferred embodiment of the shifter 106 of the first system 100. The shifter 106 mechanism for controlling the connection between the chain 210 and the sprockets 210 and 214 of the derailleur 110 consists of a servomotor 310 communicatively coupled with a drive screw 312 using a spur gear reduction transmission 314, (hereinafter, "the transmission" 314), a drive nut 316 a servo control circuit 318, (hereinafter, "the microcontroller" 318), and a potentiometer 320 for electronically measuring the position of the drive nut 316 along the axis of the drive screw 312.

It is understood that the servomotor 310 may be or comprise a linear actuator, a brushless DC motor, a brushed DC motor, a motor encoder, a driveshaft, a drive screw, a linear drive screw, a linear potentiometer and/or other suitable motor or actuator known in the art.

As the servomotor 310 through transmission 314 changes the position of the drive nut 316 along the axis of the drive screw 312 the drive nut 316 applies tension or compression to the bowden wire 216 attached to the drive nut 316 causing it to switch the connection between the chain 210 and the sprockets 210 and 214 of the derailleur 110. Furthermore, the position of the drive nut 316 for switching to each of the sprockets 210 and 214 is electrically measured by the potentiometer resistance values and saved into a shifter memory 321 of the microcontroller 318, a shown in FIG. 5. Thereafter, when the microcontroller 318 receives the instruction for changing the chain 210 coupling with the sprockets 210 or 214 from the shifter wireless communication circuit 208 the microcontroller 318 uses saved potentiometer values for directing servomotor 310 to move the drive nut 316 into a position corresponding to each of the sprockets 210 or 214 coupling with the chain 210.

The shifter 106 enclosure body consists of an assembly plates 322 and 324 and the molded rubber bumper 308 wherein the straps 304 are securely coupled with the shifter 106 body using the clamps 306 and a screws 326. Additionally, the shifter 106 receives electric power from a batteries 328 located behind a battery compartment plate 330 accessible through a battery compartment door 332 coupled with a O-ring 334, a positive contact plate 336 and secured with a screw 338.

Referring now generally to the Figures and particularly to FIG. 4A, FIG. 4A illustrates a first preferred embodiment of the remote control 108 of the first system 100 coupled with a handlebar 112 of the bicycle 104 using a handlebar mount 402 and a handlebar mount fastener 404. The remote control 108 contains a shift-up button 406 and a shift-down button 408 for initiating commands to change the connection between the chain 210 and the sprockets 210 and 214 of the derailleur 110, a low power light indicator 410 and a remote broadcast mode button 412 for initiating the wireless pairing process between the shifter 106 and the remote control 108. Optionally, the remote control 108 includes a gear configuration initiation button 416, a configuration test button 418, a configuration save button 420, a next sprocket selection button 422 and a configuration confirmation light 424 for optionally providing a configuration set point data to the shifter 106 wherein the configuration set point data is used for configuring the control of the connection between the chain 210 and the sprockets 210 and 214 of the derailleur 110.

Figure 4B:
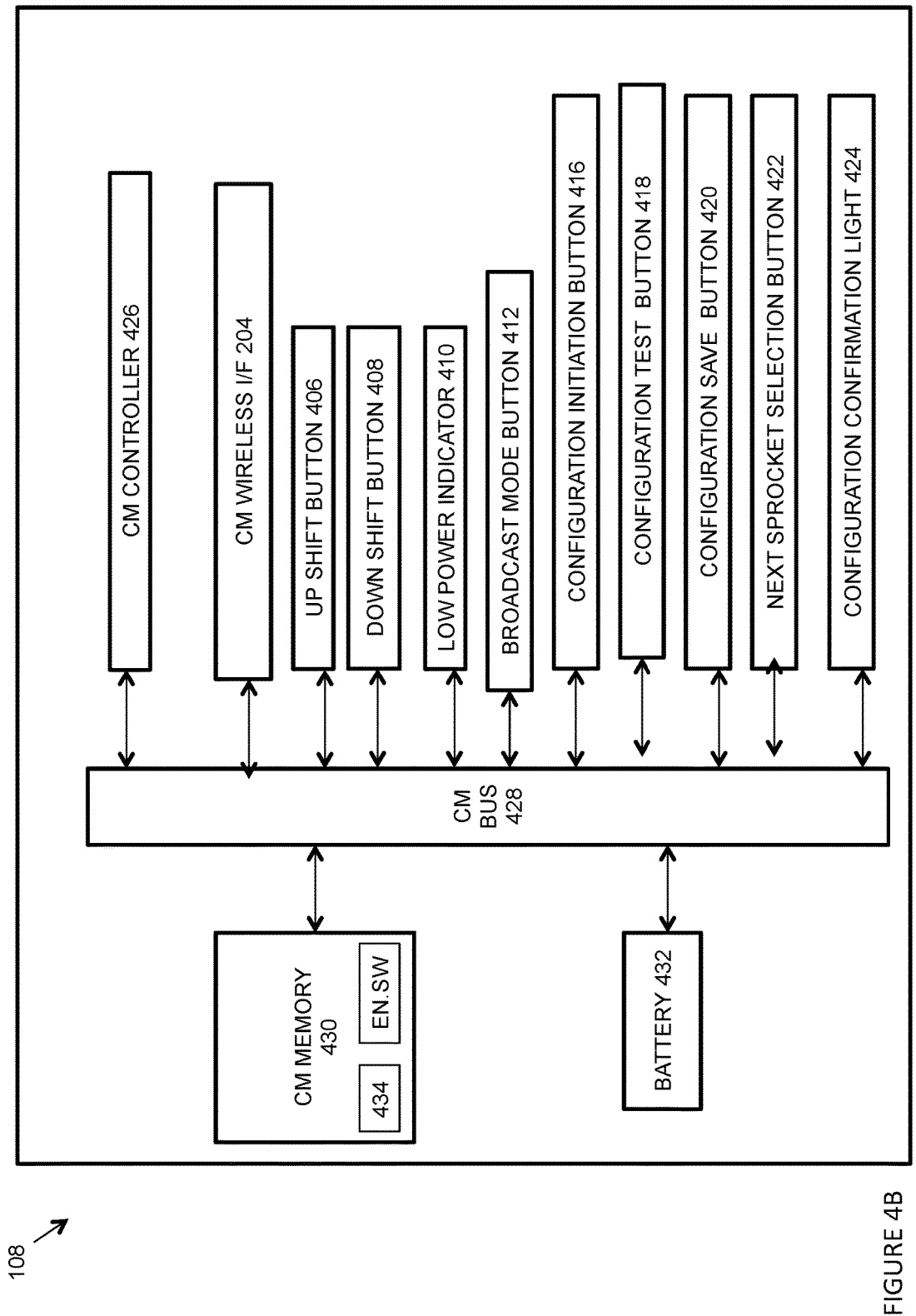
FIG. 4B is a block diagram of the control module of the first preferred embodiment of the invented system of FIG. 1.

Referring now generally to the Figures and particularly to FIG. 4B, FIG. 4B is a block diagram of the control module 108. A control module controller 426 is bi-directionally communicatively coupled by a control module power and communications bus 428 (hereinafter, "the CM bus" 428) with the control module elements 204 & 406-430. The CM bus 428 additionally distributes electrical power from the control module battery 432 to the control module elements 204 & 406-430. A control module memory 430 (hereinafter, "the CM memory" 430) stores a control module system software 434 (hereinafter "the CM software" 434). The CM software 434 includes software encoded instruction that enable the control module 108 to instantiate and perform all relevant tasks in the operation of the control module 108 as required or optionally directed by the invented method to include the method and the process steps of FIGS. 6 through 12 as disclosed herein. A copy of an encryption/decryption software EN.SW also maintained by the CM memory 430 enables the control module 108 to encrypt messages prior to transmission and decrypt messages after receipt as required or directed by the invented method to include the method and the process steps of FIGS. 6 through 12 as disclosed herein. For example, the encryption/decryption software EN.SW enables the control module 108 to selectively encrypt information transmitted in step 606 of FIG. 6, 706 of FIG. 7, and step 1210 of FIG. 12 prior to said transmissions.

Figure 5:
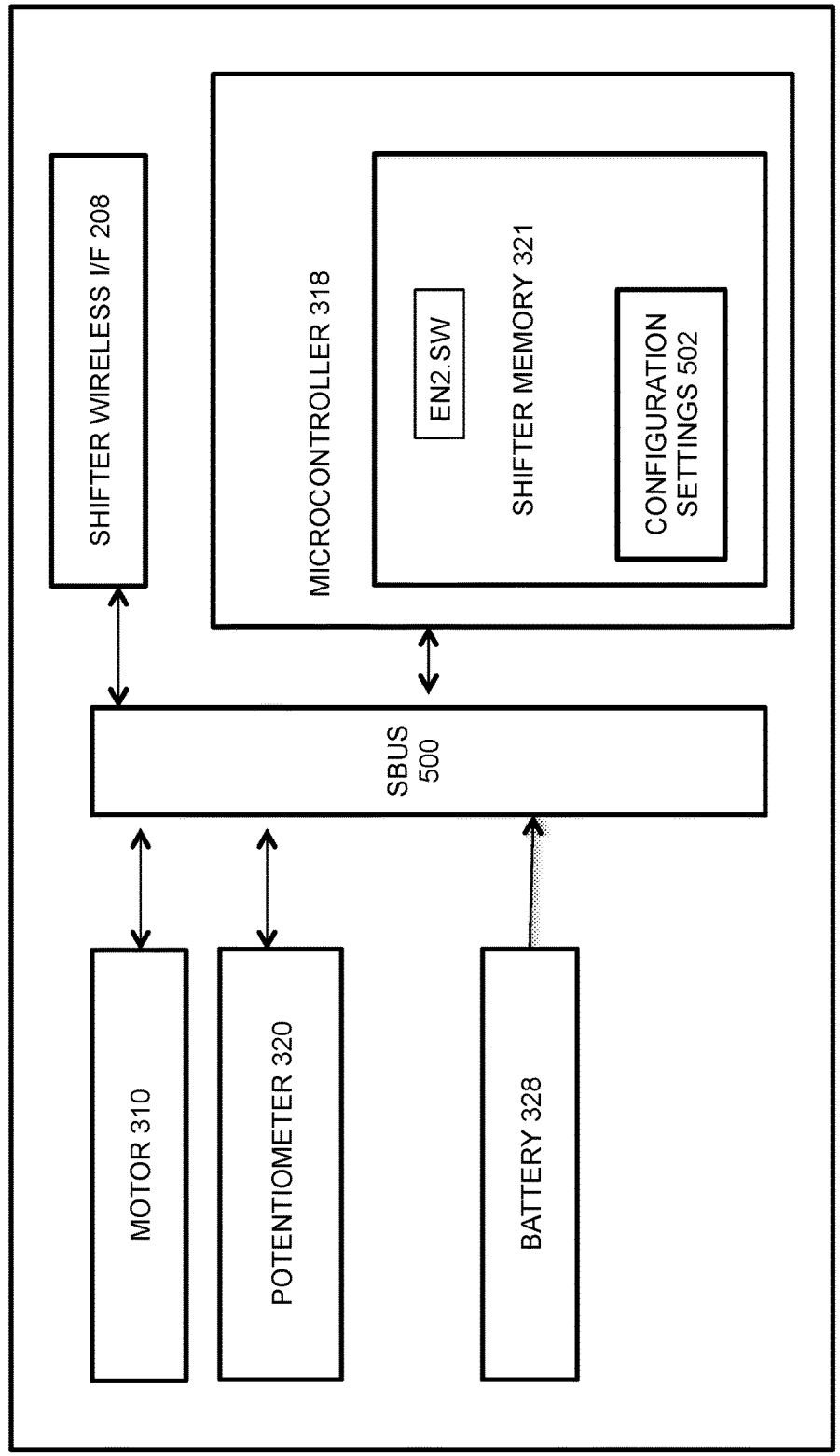
FIG. 5 is a block diagram of the shifter module of the first preferred embodiment of the invented system of FIG. 1.

Referring now generally to the Figures and particularly to FIG. 5, FIG. 5 is a block diagram of aspects of the shifter 106 and shows shifter power and control bus 500 (hereinafter "SBUS" 500) bi-directionally communicatively coupling the microcontroller 318 with the shifter wireless communications interface 208, the servomotor 310 and the potentiometer 320. The SBUS 500 additionally distributes electrical power from the shifter batteries 328 to certain other elements 208, 310-321 of the shifter 106. The shifter memory 321 stores a plurality of configuration set point data 502, a second copy of the encryption/decryption software EN2. SW and a shifter system software 504 (hereinafter "the S software" 504). The S software 504 includes software encoded instruction that enable the shifter 106 to instantiate and perform all relevant tasks in the operation of the shifter as required or optionally directed by the invented method and the process steps of FIGS. 6 through 12 as disclosed herein. The second copy of encryption/decryption software EN2.SW enables the shifter 106 to encrypt messages prior to transmission and decrypt messages after receipt as required or directed by the invented method to include the method and the process steps of FIGS. 6 through 12 as disclosed herein. For example, the second encryption/decryption software EN2.SW enables the shifter 106 to selectively decrypt encrypted information received in step 608 of FIG. 6, 708 of FIG. 7, step 814 of FIG. 8, 914 of FIG. 9, 1014 of FIG. 10, 1118 of FIG. 11, and step 1212 of FIG. 12 after receipt of transmissions.

Figure 6:
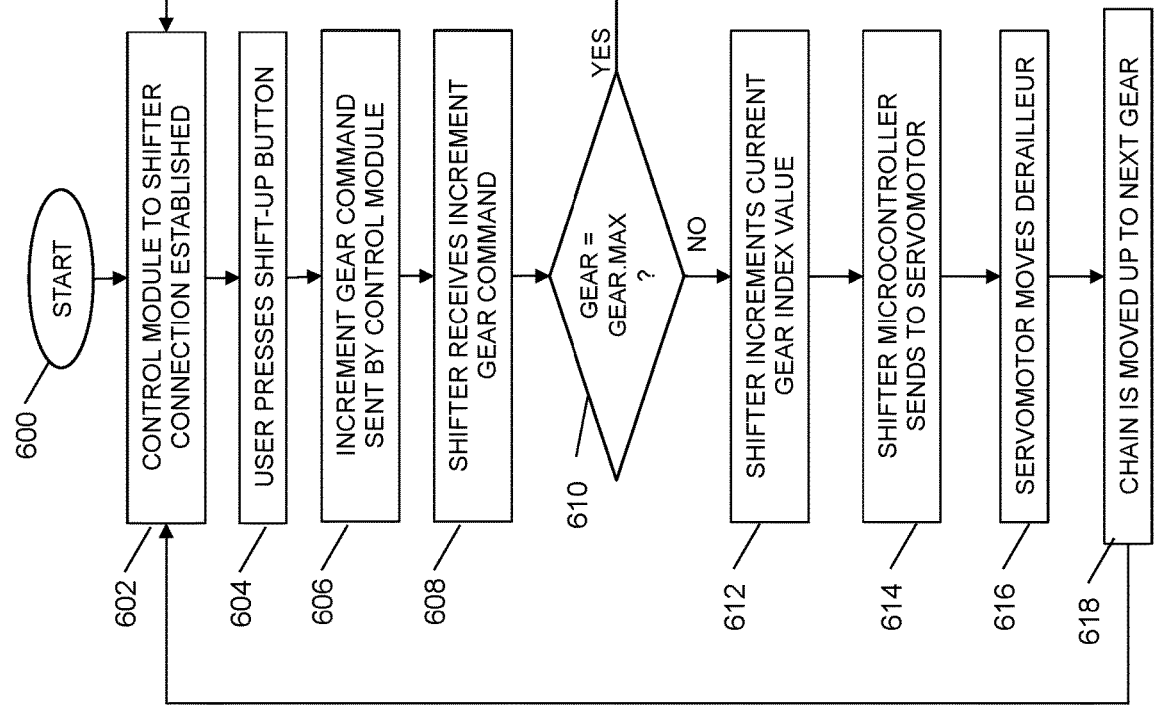
FIG. 6 is a flowchart of a method of shifting up the gears of the first preferred embodiment of the invented system of FIG. 1.

Referring now generally to the Figures and particularly to FIG. 6, FIG. 6 is a flowchart of operations of the first system 100 wherein the control module 108 is in communication with the shifter 106 and the control module 108 directs the actions of the shifter 106 to apply up shifting the derailleur 110. In step 600 the control module 108 is energized and in step 602 the control module establishes wireless communications connectivity with the shifter 106. In step 604 the control module 108 detects a user selection of the shift-up button 406 and in step 606 wirelessly transmits a gear up shift command to the shifter 106. The shifter 106 receives the wireless gear up shift command of step 606 in step 608.

The shifter 106 determines whether the chain 210 is currently engaged with the highest gear of the derailleur 110 in step 610, and if the shifter 106 determines that the chain 210 is not currently engaged with the highest gear of the derailleur 110, the shifter 106 proceeds on from step 610 to step 612 and then causes the chain 210 to move up to engage a next higher gear of the derailleur 110 in steps 612 through 618. In step 612 the shifter 106 increments a gear index value and provides the incremented gear index value to the servomotor 310 in step 614. The servomotor 310 causes the derailleur 110 to move to implement the instant gear up instruction and the chain 210 thereupon engages with a next higher gear in step 618. The first system 100 proceeds from step 618 and back to step 602.

In the alternative outcome to step 610, when the shifter 106 determines that the chain 210 is currently engaged with the highest gear of the derailleur 110, the shifter 106 proceeds back to step 602.

Figure 7:
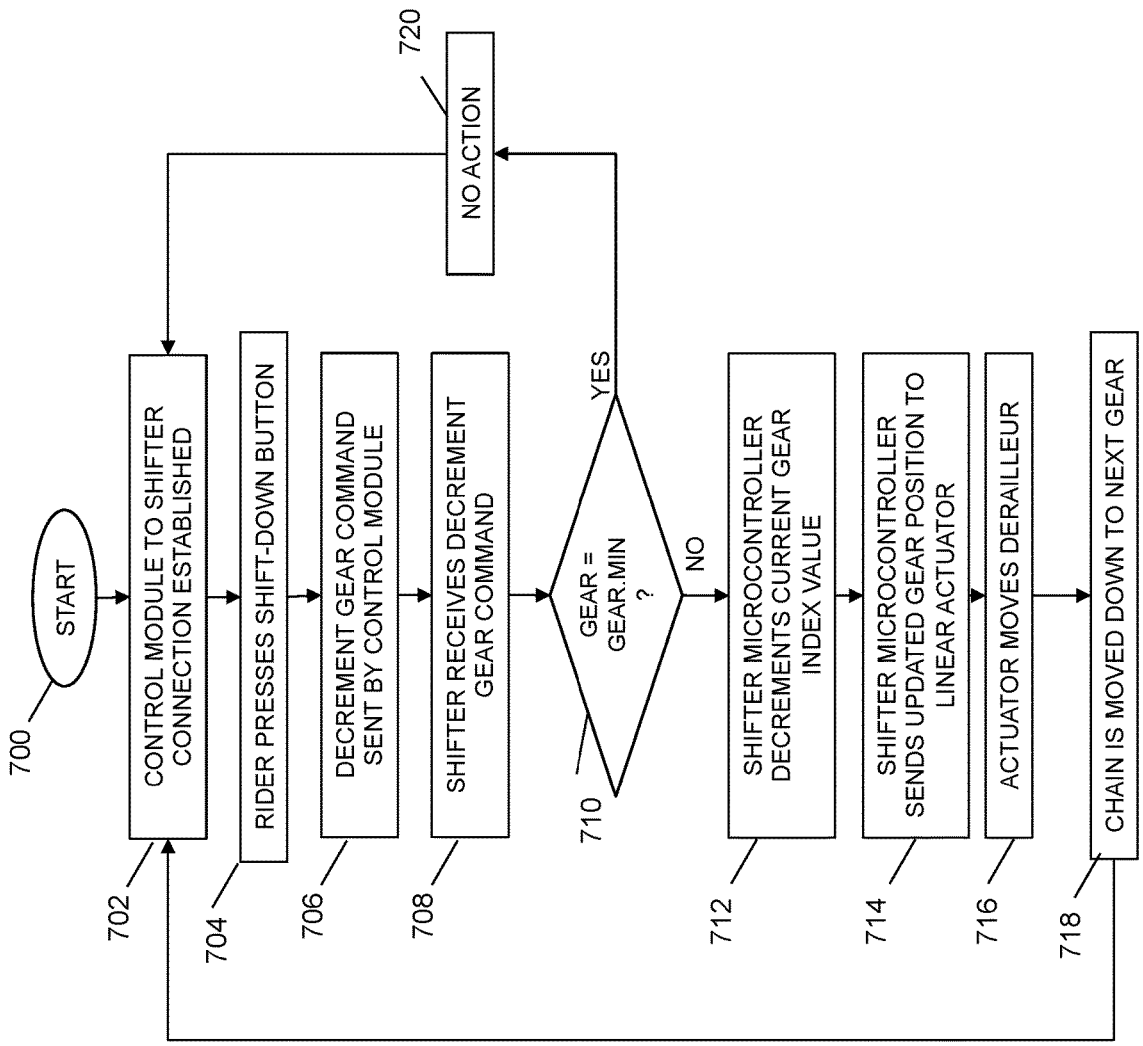
FIG. 7 is a flowchart of a method of shifting down the gears of the first preferred embodiment of the invented system of FIG. 1.

Referring now generally to the Figures and particularly to FIG. 7, FIG. 7 is a flowchart of operations of the first system 100 wherein the control module 108 is in communication with the shifter 106 and the control module 108 directs the actions of the shifter 106 to apply down shifting of the derailleur 110. In step 700 the control module 108 is energized and in step 702 the control module 108 establishes wireless communications connectivity with the shifter 106. In step 704 the control module 108 detects a user selection of the shift-down button 408 and in step 706 wirelessly transmits a gear down shift command to the shifter 106. The shifter 106 receives the wireless gear down shift message of step 706 in step 708.

The shifter 106 determines whether the chain 210 is currently engaged with the lowest gear of the derailleur 110 in step 610, and if the shifter 106 determines that the chain 210 is not currently engaged with the lowest gear of the derailleur 110, the shifter proceeds on from step 710 to step 712 and then causes the chain 210 to move down to engage a higher gear of the derailleur 110 in steps 712 through 718. In step 712 the shifter 106 decrements the gear index value and provides the decremented gear index value to the servomotor 310 in step 714. The servomotor 310 causes the derailleur 110 to move to implement the instant gear down instruction and the chain 210 thereupon engages with a next lower gear in step 718. The first system 100 proceeds from step 718 and back to step 702.

In the alternative outcome to step 710, when the shifter 106 determines that the chain 210 is currently engaged with the lowest gear of the derailleur 110, the shifter 106 proceeds back to step 702.

Figure 8:
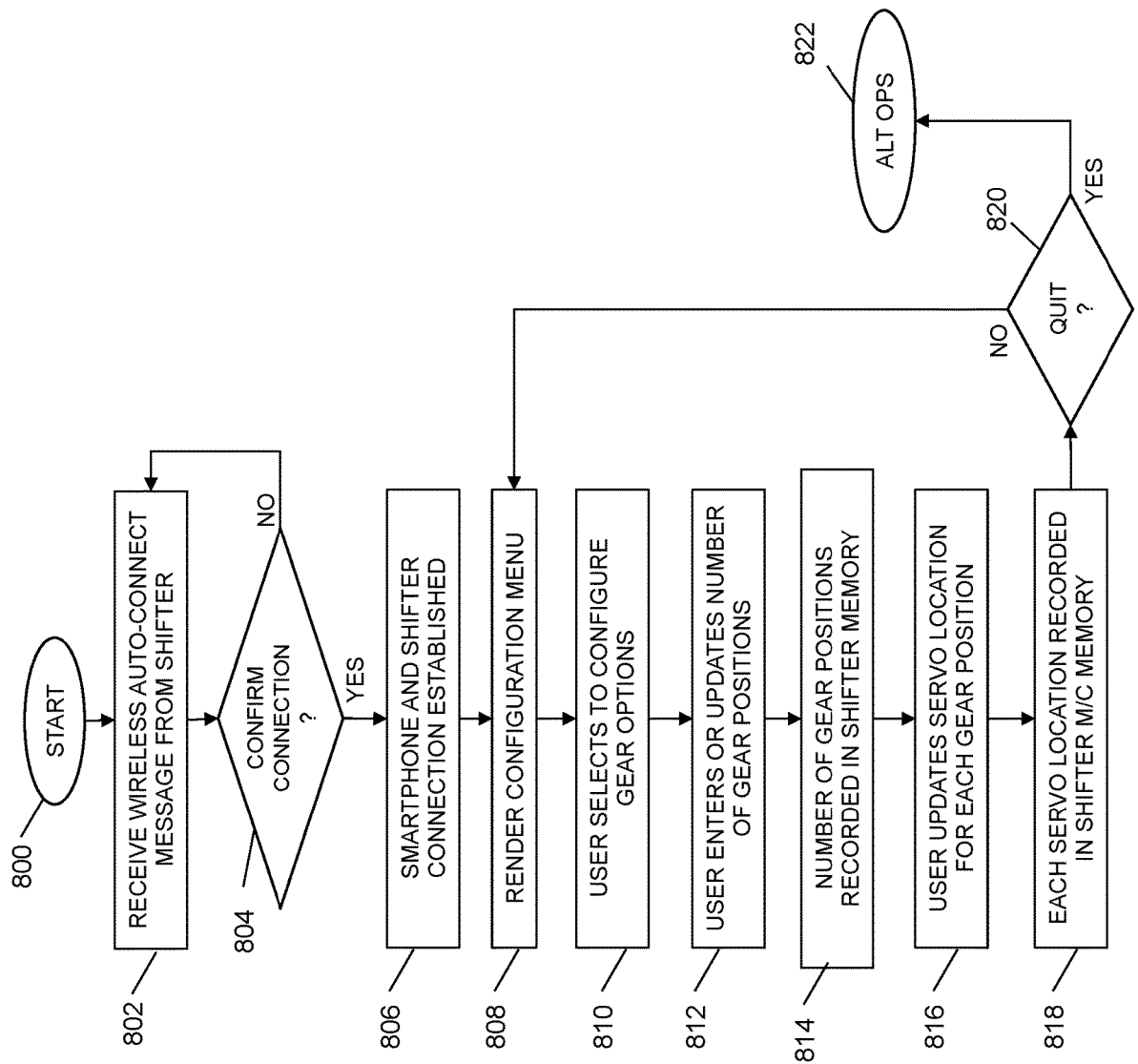
FIG. 8 is a flowchart of a method of applying the smartphone of the first preferred embodiment of the invented system of FIG. 2 to configure the servomotor of the shifter module of FIG. 1 in relation to the gears of the bicycle of FIG. 1.

Referring now generally to the Figures and particularly to FIG. 8, FIG. 8 is a flowchart of operations of the first system 100 wherein the optional smartphone 218 is in communication with the shifter 106 and whereby the user is enabled to configure gear options as would thereafter be applied by the shifter 106. In step 800 the smartphone 218 is energized and in step 802 the smartphone 218 is available to receive an automated wireless communications connectivity request from the shifter 106. In step 804 the smartphone 218 determines whether an automated wireless communications connectivity request has been received from the shifter 106 and proceeds back to step 802 when no such connectivity request message receipt is detected.

In the alternative, when the smartphone 218 determines in step 804 that a connectivity request message from the shifter 106 has been received, the first system 100 initiates a communications session between the smartphone 218 and the shifter 106 in step 806. The first system 100 proceeds from step 806 to perform an iteration of the loop of steps 808 through 820. In step 808 the smartphone 218 renders a configuration menu of gear options as informed by information received from the shifter 106. In step 810 user optionally directs the smartphone 218 to enable a modification of gear option information optionally as received from the shifter 106. The user enters gear position updates and modifications into the smartphone 218 in step 812, and in step 814 the shifter 106 receives this gear position updates and modification information and stores the received gear position updates and modification information in the shifter memory 321.

The user further optionally enters servomotor location specifications for one or more individual gear positions into the smartphone 218 in step 816, and in step 818 the shifter 106 receives this servomotor location specification information and stores the received servomotor location specification information in the shifter memory 321. The user next directs the smartphone 218 in step 820 whether to proceed onto alternate computational operations in step 822, or in the alternative to proceed back to an additional execution of step 808.

Figure 9:
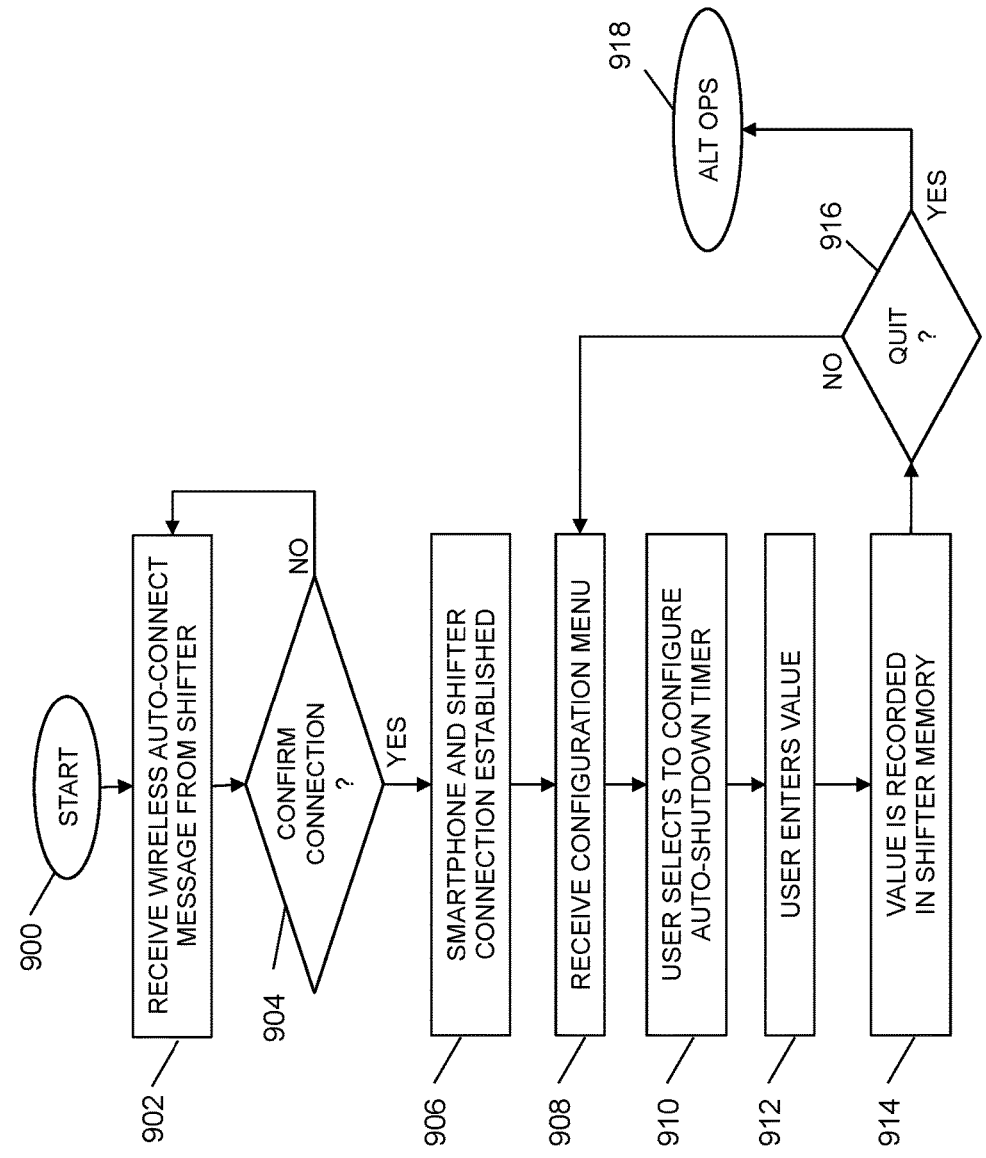
FIG. 9 is a flowchart of a method of applying the smartphone of the first preferred embodiment of the invented system of FIG. 2 to configure a shutdown timer of the shifter module of FIG. 1.

Referring now generally to the Figures and particularly to FIG. 9, FIG. 9 is a flowchart of operations of the first system 100 wherein the optional smartphone 218 is in communication with the shifter 106 and whereby the user is enabled configure an automatic shutdown timer function the of the shifter 106. In step 900 the smartphone 218 is energized and in step 902 the smartphone 218 is available to receive an automated wireless communications connectivity request from the shifter 106. In step 904 the smartphone 218 determines whether an automated wireless communications connectivity request has been received from the shifter 106 and proceeds back to step 902 when no such connectivity request message receipt is detected.

In the alternative, when the smartphone 218 determines in step 904 that a connectivity request message from the shifter 106 has been received, the first system 100 initiates a communications session between the smartphone 218 and the shifter 106 in step 906. The first system 100 proceeds from step 906 to perform an iteration of the loop of steps 908 through 916. In step 908 the smartphone 218 renders a configuration menu as informed by information received from the shifter 106. In step 910 the user optionally selects and initiates an automatic shutdown time value configuration utility of the smartphone system software M.SYS.SW. The smartphone 218 optionally in step 912 receives a user entered or user selected time value and communicates the user specified time value to the to the shifter 106. When received, the shifter 106 stores the time value as transmitted in step 912 and stores this time value in the shifter memory 321 as an automatic shut down time value in step 916.

The user next directs the smartphone 218 in step 916 whether to proceed onto alternate computational operations in step 918, or in the alternative to proceed back to an additional execution of step 908.

Figure 10:
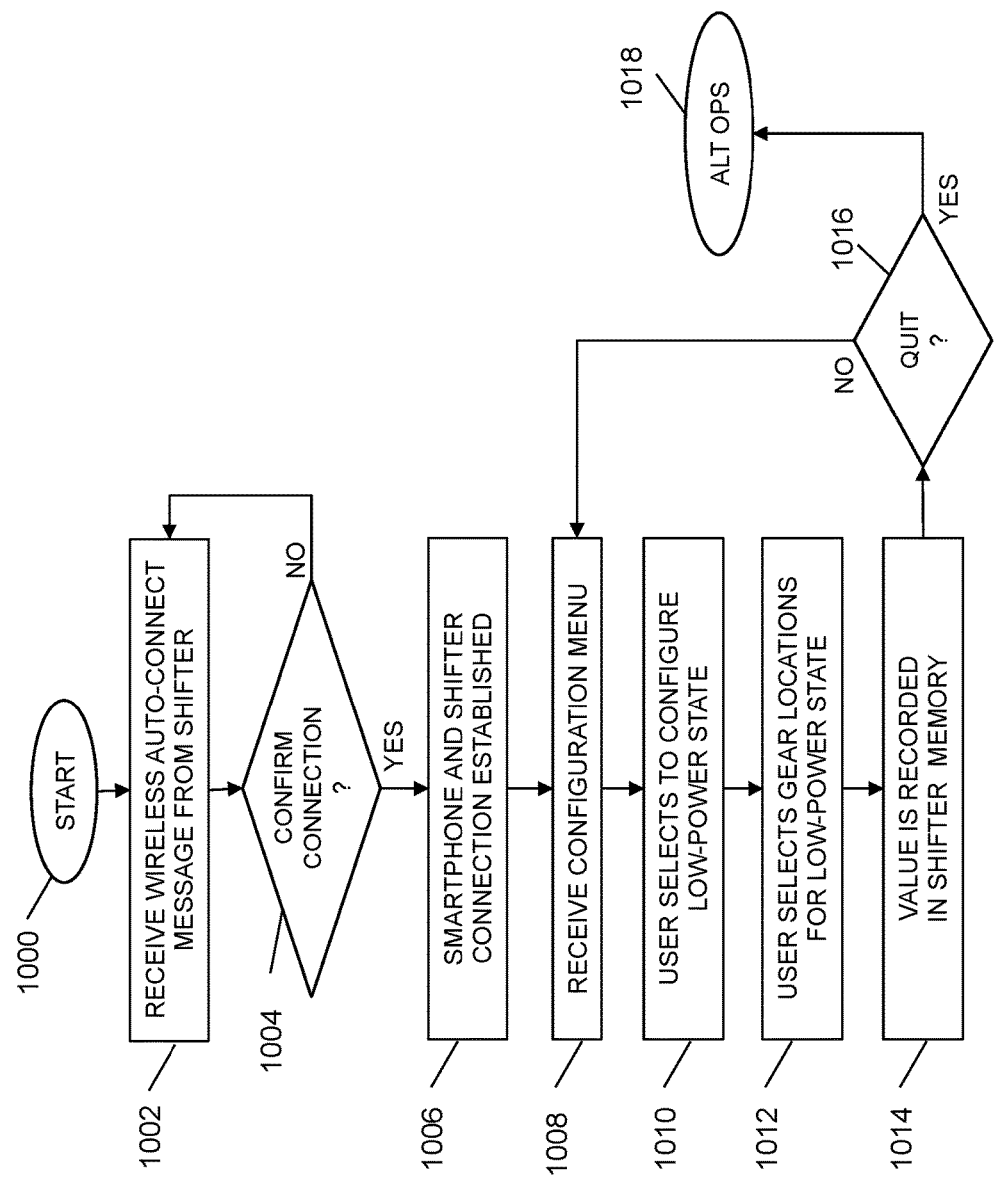
FIG. 10 is a flowchart of a method of applying the smartphone of the first preferred embodiment of the invented system of FIG. 2 to configure low-power state of the shifter module of FIG. 1.

Referring now generally to the Figures and particularly to FIG. 10, FIG. 10 is a flowchart of operations of the first system 100 wherein the optional smartphone 218 is in communication with the shifter 106 whereby the user is enabled configure a low power state of the shifter 106. In step 1000 the smartphone 218 is energized and in step 1002 the smartphone 218 is available to receive an automated wireless communications connectivity request from the shifter 106. In step 1004 the smartphone 218 determines whether an automated wireless communications connectivity request has been received from the shifter 106 and proceeds back to step 1002 when no such connectivity request message receipt is detected.

In the alternative, when the smartphone 218 determines in step 1004 that a connectivity request message from the shifter 106 has been received, the first system 100 initiates a communications session between the smartphone 218 and the shifter 106 in step 1006. The first system 100 proceeds from step 1006 to perform an iteration of the loop of steps 1008 through 1016. In step 1008 the smartphone 218 renders a configuration menu as informed by information received from the shifter 106. In step 1010 the user optionally selects and initiates a low power configuration utility of the smartphone system software M.SYS.SW. The smartphone 218 optionally in step 1012 receives a user entered or user selected low power gear location specifications intended to define a low power state of the shifter 106, and thereupon transmits the low power gear location specifications to the to the shifter 106. When received, the shifter 106 stores the low power gear location specifications as transmitted in step 1012 and stores these specifications in the shifter memory 321 in step 1014.

The user next directs the smartphone 218 in step 1016 whether to proceed onto alternate computational operations in step 1018, or in the alternative to proceed back to an additional execution of step 1008.

Figure 11:
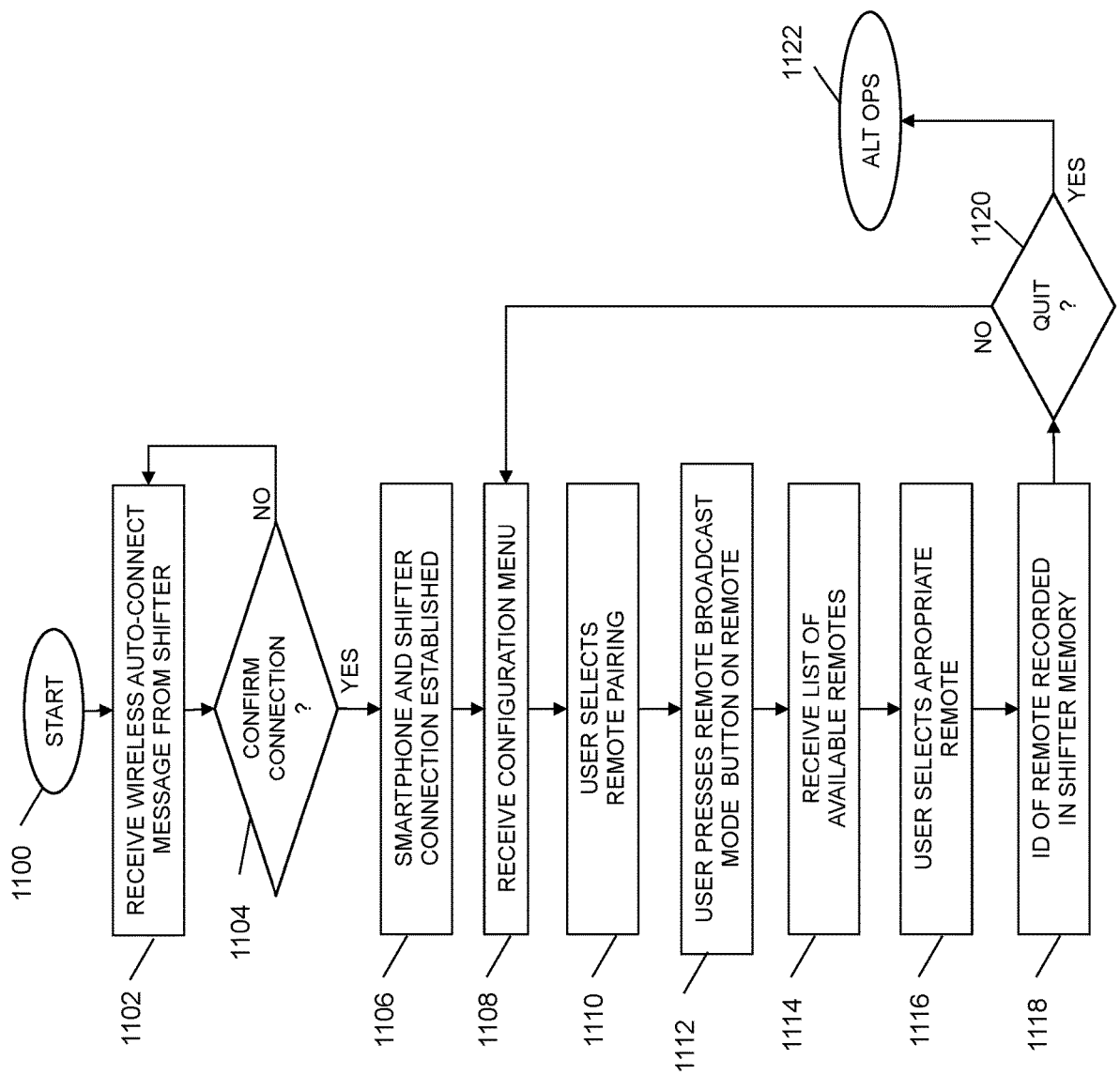
FIG. 11 is a flowchart of a method of applying the smartphone of the first preferred embodiment of the invented system of FIG. 2 to configure a pairing of the shifter module of FIG. 1 in relation to the gears of the bicycle of FIG. 1.

Referring now generally to the Figures and particularly to FIG. 11, FIG. 11 is a flowchart of operations of the first system 110 wherein the optional smartphone 218 is in communication with the shifter 106 whereby the user is enabled to perform a wireless communications pairing of the shifter 106 and an additional remote communications device (not shown). In step 1100 the smartphone 218 is energized and in step 1102 the smartphone 218 is available to receive an automated wireless communications connectivity request from the shifter 106. In step 1104 the smartphone 218 determines whether an automated wireless communications connectivity request has been received from the shifter 106 and proceeds back to step 1102 when no such connectivity request message receipt is detected.

In the alternative, when the smartphone 218 determines in step 1104 that a connectivity request message from the shifter 106 has been received, the first system 110 initiates a communications session between the smartphone 218 and the shifter 106 in step 1106. The first system 110 proceeds from step 1106 to perform an iteration of the loop of steps 1108 through 1120. In step 1108 the smartphone 218 renders a configuration menu as informed by information received from the shifter 106. In step 1110 the user optionally selects and initiates a remote pairing configuration utility of the smartphone system software M.SYS.SW. The smartphone 218 optionally in step 1112 receives a user selection of a remote broadcast mode and in step 1114 renders a listing of device identifiers of possible devices for selection by the use for communications pairing with the shifter 106.

The smartphone 218 optionally in step 1116 receives a user selection of a remote device identifier as rendered in step 1114 and a device identifier, e.g., universally unique identifier, known in the art as a UUID, associated with the selected remote device identifier as a network address, i.e. a or unique identifier is transmitted from the smartphone 218 to the shifter 106. The shifter 106 in step 1118 stores the device identifier received from the smartphone 218 in the shifter memory 321.

The user next directs the smartphone 218 in step 1120 whether to proceed onto alternate computational operations in step 1124, or in the alternative to proceed back to an additional execution of step 1108.

Figure 12:
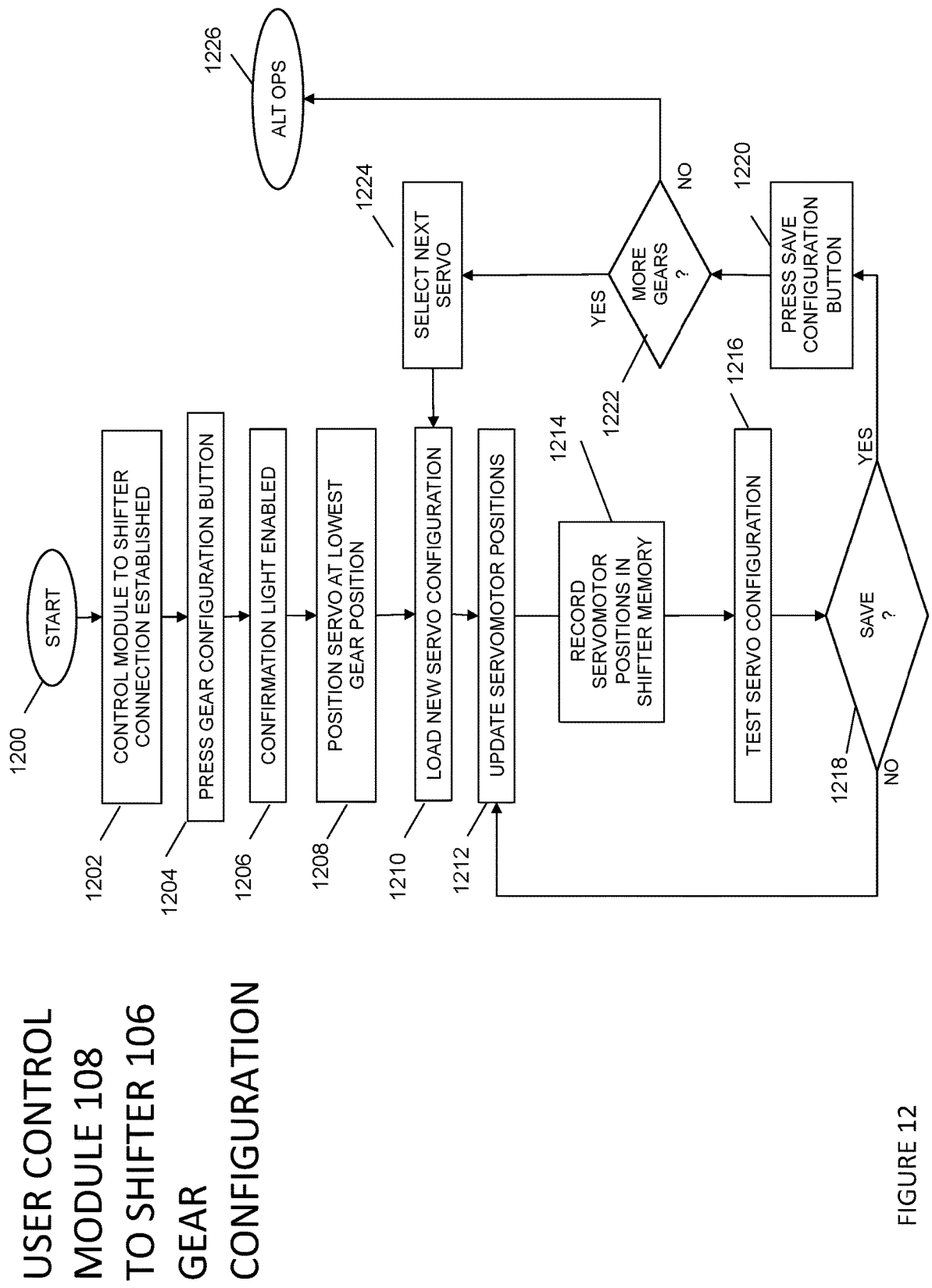
FIG. 12 is a flowchart of a method of applying the control module of the first preferred embodiment of the invented system of FIG. 1 to configure servomotor positions of the shifter module of FIG. 1 in relation to the gears of the bicycle of FIG. 1.

Referring now generally to the Figures and particularly to FIG. 12, FIG. 12 is a flowchart of operations of the first system 120 wherein the control module 108 is in communication with the shifter 106 and whereby the user is enabled to perform a configuration of the servomotor set points of the shifter 106 relative to one or more gears of the derailleur 110. These servomotor settings of the shifter 106 will be implemented upon receipt by the shifter of user gear selection commands as entered via the control module 108 by the user in later operation of the bicycle 104. In step 1200 the control module 108 is energized and in step 1202 the first system 120 initiates a communications session between the control module 108 and the shifter 106 in step 1202. The first system 120 proceeds from step 1206 wherein the user may optionally selects and initiates a servomotor configuration utility of the control module 108 CM.SYS.SW by pressing the gear configuration button 416 of the control module 106. The control module 108 optionally in step 1206 illuminates the user module confirmation light 424 to assure and inform the user that the servomotor configuration utility of the control module 108 CM.SYS.SW is activated. In step 12.08 the servomotor 310 is positioned at the lowest gear selection position and in step 1210 the user enters a new servomotor configuration set point data into the control module 106 and the user control module 106 transmits this newly received servomotor configuration set point data to the shifter 106.

The shifter 106 updates the servomotor position settings as stored in the shifter memory 321 with the newly received servomotor configuration set point data in step 1214. The user may optionally test, by operation of the invented system 100, the effect of application by the shifter 106 of the newly received servomotor configuration set point data in gear shifting of the derailleur 110 in step 1216. The user directs the shifter in step 1218 to either proceed onto save the newly received servomotor configuration set point data for continued application by pressing the save gear configuration button 420 of the control module 108. When the control module 108 does not detect a selection of the save gear configuration button in step 1218, the invented system 100 proceeds back to another execution of step 1212.

In the alternative, when the control module 108 does not detect a selection of the save gear configuration button in step 1218, the control module 108 directs the shifter 106 in step 1220 to save the new configuration set point data in the shifter memory 321 for continued in application in operation of the shifter 106. In step 1222 the first system 100 determines via inputs to the user module 108 if the user has directed the control module 108 to receive additional servomotor configuration set point data.

When the first system 100 determines in step 1222 that the user has directed the control module 108 to receive additional servomotor configuration set point data, the first system 100 proceeds onto step 1224 and receives an additional gear selection by the user via the control module 108. The first system 100 proceeds from step 1224 to an additional execution of step 1210.

When the first system 100 determines in step 1222 that the user has not directed the control module 108 to receive additional servomotor configuration set point data, the first system 100 proceeds onto alternate operations of step 1226.

Figure 13:
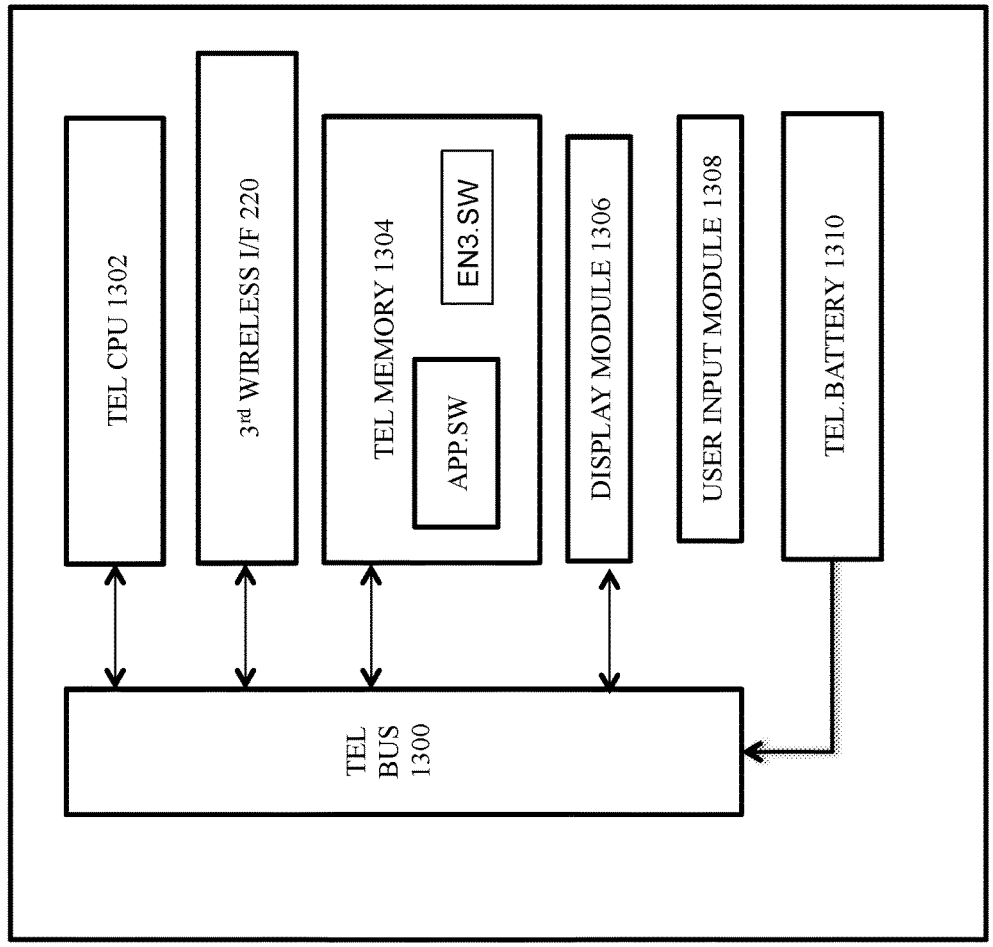
FIG. 13 is a block diagram of the smartphone of the first preferred embodiment of the invented system of FIG. 2.

Referring now generally to the Figures and particularly to FIG. 13, FIG. 13 is a block diagram of aspects of the smartphone 218 and shows a telephone communications and power bus 1300 (hereinafter "TEL BUS" 1300) bi-directionally communicatively coupling a telephone CPU 1302 with the third wireless communications interface 220, a telephone memory 1304, a visual display module 1306, and a user input module 1308. The TEL BUS 1300 additionally distributes electrical power from a telephone battery 1310 to certain other elements 220 & 1300-1308 of the shifter 106. The telephone memory 1304 stores third copy of an encryption/decryption software EN2.SW and an applications software APP.SW. The applications software APP.SW includes software encoded instruction that enable the smartphone 218 to instantiate and perform all relevant tasks in the operation of the shifter as required or optionally directed by the invented method and the process steps of FIGS. 6 through 12 as disclosed herein. The third copy of encryption/decryption software EN3.SW enables the smartphone 218 to encrypt messages prior to transmission and decrypt messages after receipt as required or directed by the invented method to include the method and the process steps of FIGS. 6 through 12 as disclosed herein. For example, the third copy of then encryption/decryption software EN3.SW enables the control module 108 to selectively encrypt information transmitted in step 812 of FIG. 8, 912 of FIG. 9, step 1012 of FIG. 10, and step 1116 of FIG. 11 prior to said transmissions.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While selected embodiments have been chosen to illustrate the invented system, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment, it is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

I claim:

1. A system operatively coupled with an adjustment cable of a bicycle assembly, the bicycle assembly further comprising a derailleur, a chain and a plurality of rotatably coupled sprockets, the derailleur coupled with the adjustment cable and the derailleur configured to alter the position of the chain in relation to the plurality of rotatably coupled sprockets as motivated by movement of the adjustment cable, the system comprising:
    an actuator comprising:
        a movable arm coupled with the adjustment cable;
        a means to position the movable arm;
        a memory;
        a wireless communications interface; and
        a processor communicatively coupled with the wireless communications interface and memory and configured to:
            record a user-defined plurality of distinguishable gear settings in the memory;
            store in the memory the position of the movable arm in association with a selected gear setting as directed by wireless communications;

adjust the position of the movable arm as directed by wireless communications;

load a gear setting from the memory as directed by wireless communications and adjust the position of the arm in accordance with the retrieved gear setting; and a wireless electronic communications device comprising:
a memory;
a user interface;
a wireless communications interface; and
a processor communicatively coupled with the wireless communications interface and memory, and adapted to direct the actuator to perform the following actions:
define a new gear setting record in memory;
select a predefined gear setting;
adjust the position of the movable arm;
record a current measure of the position of the movable arm in association with a selected gear setting; and
direct the actuator to retrieve a selected gear setting from the actuator memory and implement the selected gear setting.

2. The system of claim 1, wherein the actuator comprises a brushless DC motor.

3. The system of claim 1, wherein the actuator comprises a brushed DC motor.

4. The system of claim 1, wherein the actuator further comprises a motor encoder.

5. The system of claim 4, wherein the motor encoder comprises a driveshaft.

6. The system of claim 5, wherein the motor encoder comprises a drive screw.

7. The system of claim 6, wherein the drive screw is a linear drive screw.

8. The system of claim 1, wherein the actuator further comprises:
a drive screw;
a drive nut movably coupled with the drive screw;
a linear potentiometer coupled with the drive nut; and
a grounding wiper coupled with the linear potentiometer.

9. The system of claim 8, further comprising a tension element coupled with the drive nut, wherein the drive nut motivates the tension element.

10. The system of claim 8, wherein the actuator further comprises a tension/compression element coupled with the drive nut, wherein the drive nut motivates the tension/compression element.

11. The system of claim 1, wherein the actuator further comprises a pulse width modulation circuit.

12. The system of claim 1, wherein the actuator further comprises a linear potentiometer.

13. The system of claim 1, wherein the actuator further comprises:
a drive nut coupled with the transmission;
a tension/compression element coupled with the drive nut, wherein the drive nut motivates the tension/compression element; and
a grounding wiper coupled with the drive nut.

14. The system of claim 1, wherein the electronic communications device renders a programmable interface adapted to enable a user to establish set point values for inclusion in commands.

15. The system of claim 1, wherein the actuator is programmed to switch to a preselected default gear when the voltage falls below a critical value.

16. The system of claim 1, wherein the wireless electronic communications device is a computing device running a software application suitable for directing the actuator as stated.

17. The system of claim 1, wherein the wireless communications device is a control module suitable for coupling to a bicycle handlebar and operated manually by a user while the user is riding the bicycle.

18. The system of claim 17, wherein the control module and the electronic communications device are integrated into the same module.

19. The system of claim 17, wherein the control module transmits commands in accordance with a wireless communications standard.

20. The system of claim 19, wherein the control module transmits commands in accordance with a Bluetooth wireless communications standard.

21. The system of claim 19, wherein the control module transmits commands in accordance with an encryption standard communications standard.

22. A system operatively coupled with an adjustment cable of a bicycle assembly, the bicycle assembly further comprising a derailleur, a chain and a plurality of rotatably coupled sprockets, the derailleur coupled with the adjustment cable and the derailleur configured to alter the position of the chain in relation to the plurality of rotatably coupled sprockets as motivated by movement of the adjustment cable, the system comprising:
an actuator comprising:
a movable arm coupled with the adjustment cable;
a means to controllably position the movable arm;
a memory;
a wireless communications interface; and
a processor communicatively coupled with the wireless communications interface and memory and configured to:
associate a plurality of distinguishable gear settings in the memory, wherein each gear setting is associated with an encoding of a position of the moveable arm;
load a gear setting from the memory as directed by wireless communications and adjust the position of the arm in accordance with the retrieved gear setting;
adjust the position of the movable arm as directed by wireless communications;
receive and execute a command to revise an encoded position of a contemporaneously selected gear setting to an encoding of a current position of the moveable arm; and a wireless electronic communications device coupled with a handlebar of the bicycle, the wireless electronic communications device comprising:
a memory;
a manual user interface;
a wireless communications interface; and
a processor communicatively coupled with the wireless communications interface and memory, and adapted to direct the actuator to perform the following actions:
select a predefined gear setting as directed by manual engagement of the manual user interface;
direct the actuator to retrieve a selected gear setting from the actuator memory and implement the selected gear setting;
direct the actuator by wireless communications to adjust the position of the movable arm; and transmit by wireless communications, as directed by manual engagement of the manual user interface, a command to revise an encoded position associated with a currently selected gear setting to an encoding of a current position of the moveable arm.

23. The system of claim 22, wherein the wireless electronic communications device transmits commands in accordance with an encryption communications standard.

24. The system of claim 22, wherein the wireless electronic communications device comprises a manual programmable interface adapted to enable a user to manually establish set point values for inclusion in commands.

* * * * *